United States Patent [19]

Hirosawa et al.

[11] Patent Number: 5,251,539
[45] Date of Patent: Oct. 12, 1993

[54] BELLOWS PUMP

[75] Inventors: Koichiro Hirosawa; Hiroshi Kubo, both of Kariya; Masanobu Matsusaka, Toyota, all of Japan

[73] Assignee: Aisin Seiki Kabushiki Kaisha, Kariya, Japan

[21] Appl. No.: 853,590

[22] Filed: Mar. 18, 1992

[30] Foreign Application Priority Data

Mar. 26, 1991 [JP] Japan .................................. 3-86113
Mar. 26, 1991 [JP] Japan .................................. 3-86114
Mar. 30, 1991 [JP] Japan .................................. 3-93191

[51] Int. Cl.$^5$ ............................................. F16J 3/04
[52] U.S. Cl. ................................................. 92/34
[58] Field of Search ................... 92/34, 35, 37, 39, 41, 92/45, 89

[56] References Cited

U.S. PATENT DOCUMENTS

| | | |
|---|---|---|
| 2,654,324 | 10/1953 | Ryba . |
| 2,657,074 | 10/1953 | Schwester et al. ............... 92/34 |
| 2,669,937 | 2/1954 | Presentey . |
| 2,814,253 | 11/1957 | Pleuger et al. . |
| 2,856,857 | 10/1958 | Saalfrank . |
| 2,942,838 | 6/1960 | Peters ............................ 92/41 |
| 2,953,096 | 9/1960 | Sampietro . |
| 2,960,936 | 11/1960 | Dean et al. . |
| 3,476,053 | 11/1969 | Czarnecki et al. . |
| 4,110,058 | 8/1978 | Langle et al. . |
| 4,199,535 | 4/1980 | Kuhlen . |
| 4,372,208 | 2/1983 | Legardinier . |

FOREIGN PATENT DOCUMENTS

| | | | |
|---|---|---|---|
| 2320835 | 11/1974 | Fed. Rep. of Germany | 92/34 |
| 10862 | 2/1981 | Japan | 92/34 |
| 47065 | 3/1982 | Japan | 92/34 |
| 3-126089 | 12/1991 | Japan . | |

Primary Examiner—Edward K. Look
Assistant Examiner—F. Daniel Lopez
Attorney, Agent, or Firm—Burns, Doane, Swecker & Mathis

[57] ABSTRACT

A bellows pump comprises a body, a movable supporting member supported in the body movably, a bellows fixed between the body and the movable supporting member, peak portions of the bellows, and a driving means for driving the movable supporting member, wherein the bellows has a thin portion and a thick portion, and pitches of the bellows are in inverse proportion to the thicknesses thereof.

9 Claims, 3 Drawing Sheets

BELLOWS PUMP

BACKGROUND OF THE INVENTION

1. Field of the Invention

The present invention relates to a bellows pump and more particularly to a bellows pump to pump a fluid or to use as a compressor and an actuator.

2. Description of the Related Art

In general, a bellows pump has a pumping action according to the expansion and contraction of a bellows. A pumping room of the bellows pump comprises the bellows and a housing. The bellows has some peak portions and each peak portion has a fixed thickness and a fixed pitch. One end of the bellows is fixed to a stationary member and the other end thereof is fixed to a movable member. Here, the bellows is repeatedly stressed when the bellows expands and contracts and when the bellows receives a pressure of a pumped fluid. Therefore, the bellows is of poor lasting quality.

On the other hand, when a driving speed of the bellows is low, all of the pitches of two adjacent peak portions vary equally. However, when the driving speed is high, the pitches of two adjacent peak portions differ depending on a location of each peak portion. Namely, when the bellows expands, excessive pitches are shown in some portion, and when the bellows contracts, too little pitches are shown in some other portion. As a result, the stress of the bellows increases in high speed driving condition, and the bellows is of poor lasting quality.

SUMMARY OF THE INVENTION

Accordingly, it is a primary object of the present invention to increase a lasting quality of a bellows of a bellows pump.

The above and other objects are achieved according to the present invention by a bellows pump which comprises a body, a movable supporting member supported in the body, a bellows fixed between the body and the movable supporting member, peak portions of the bellows, and a driving means for driving the movable supporting member, wherein the bellows has a thin portion and a thick portion, and pitches of the bellows are in inverse proportion to the thicknesses thereof.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE INVENTION

Figure 1:
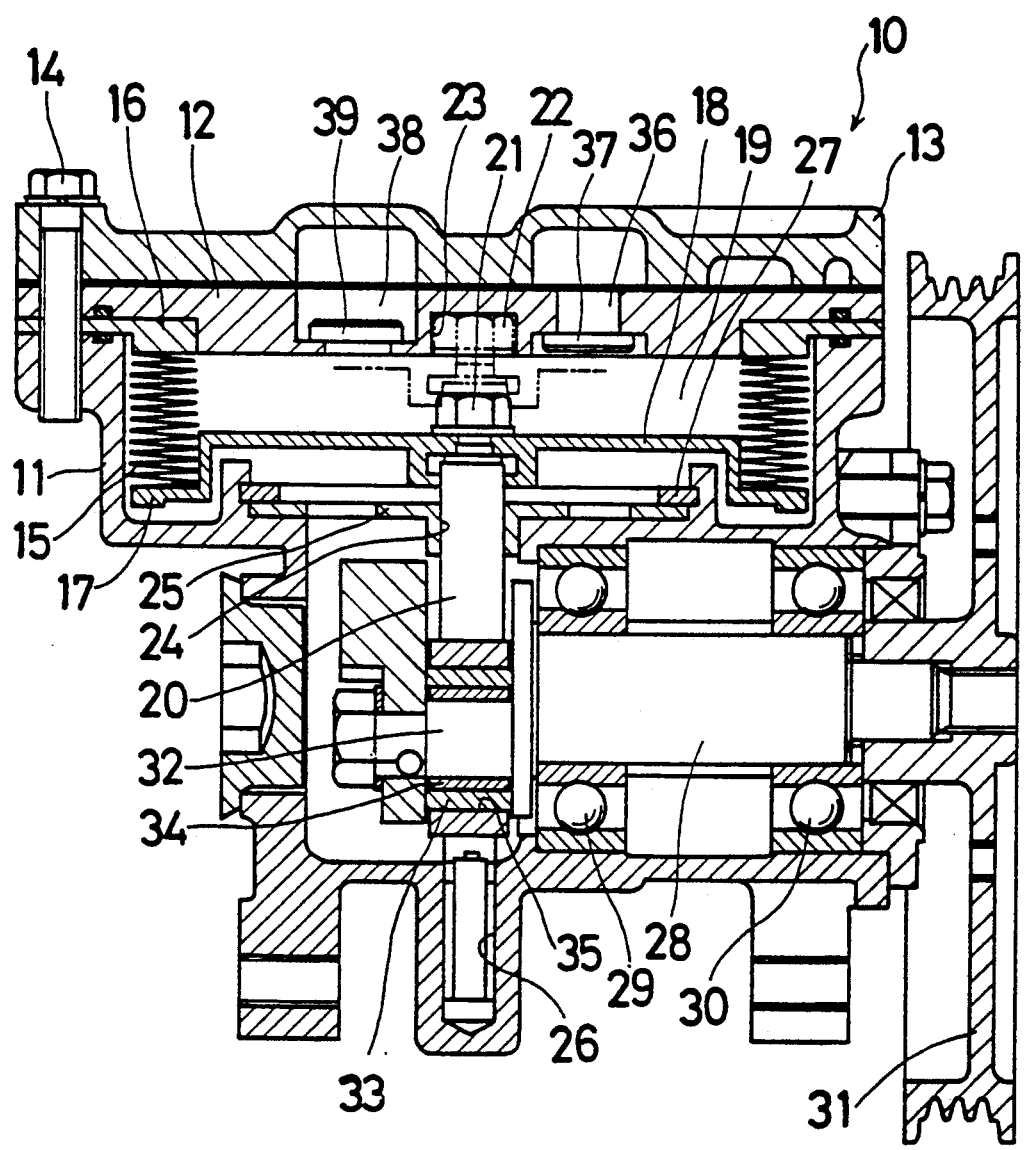
FIG. 1 is a cross-sectional view of a bellows pump according to the embodiment of the invention.

Referring first to FIG. 1 a bellows pump 10 is shown. A first body 11, second body 12 and cover 13 are integrated into one unit by a bolt 14. A bellows 15 is located in the first body 11 and second body 12. One end (upper end) of the bellows 15 is fixed to a ring-shaped stationary supporting member 16 which is held between an outer portion of the first body 11 and an outer portion of the second body 12. The other end (lower end) of the bellows 15 is fixed to a disk-shaped movable supporting member 17 which has a projection 18. A pumping room 19 is formed in a space surrounded by the second body 12, bellows 15 and movable supporting member 17.

One end (upper end) of a rod 20 is fixed to a center portion of the movable supporting member 17 via a nut 21. In FIG. 1, the nut 21 shown by a real line shows the lowermost point and the nut 22 shown by a dotted line shows the uppermost point. When the nut 22 locates at the uppermost point, the nut 22 locates in a depression 23. Namely, the movable supporting member 17 is driven in a vertical motion by the rod 20 and a capacity of the pumping room 19 is varied.

The rod 20 is supported by a boss 24 of a supporting member 25 and a hole portion 26 formed in the first body 11. The supporting member 25 is fixed to the first body 11 via a snap ring 27. A vertical motion of the rod 20 is caused by a revolution of an input shaft 28. The input shaft 28 is supported rotatably via bearings 29,30. An input pulley 31 is fixed to one end (right end) of the input shaft 28 and is driven by a driving source (not shown). A shaft portion 32 whose center is different from a center of the input shaft 28 is formed at the other end (left end) of the input shaft 28.

A roller 33 is supported on the shaft portion 32 via a bearing 34, and is rotated by the input shaft 28 around the center of the input shaft 28, and is located in the window portion 35 formed in the rod 20. The roller 33 can slide in the window portion 35. Thus, the pulley 31 is driven by the driving source, the shaft portion 32 rotates, the rod 20 is caused to move vertically and the bellows 15 expands and contracts. When the movable supporting member 17 is in the uppermost portion, the pumping room 19 is in the maximum expanding condition. On the other hand, when the movable supporting member 17 is in the lowermost portion, the pumping room 19 is in the maximum compressing condition.

An intake port 36 is formed in the second body 12 and an intake valve 37 is located in the intake port 36. A discharge port 38 is formed in the second body 12 and an discharge valve 39 is located in the discharge port 38. A driving means for driving the movable supporting member 17 comprises the rod 20 and the input shaft 28, etc.

In the above mentioned bellows pump 10, the driving source drives the pulley 31 and input shaft 28, so that the rod 20 and movable supporting member 17 are in vertical motion. Thus, the capacity of the pumping room 19 is varied, and the fluid is pumped from the intake port 36 to the discharge port 38.

Next, some modifications of the bellows 50,55,60,65,70 are described referring to FIGS. 2,3,4,5 and 6. There are 10 peak portions in FIGS. 2,3,4 and 5 and there are 6 peak portions in FIG. 6. An uppermost peak portion is called a first peak portion for describing.

Figure 2:
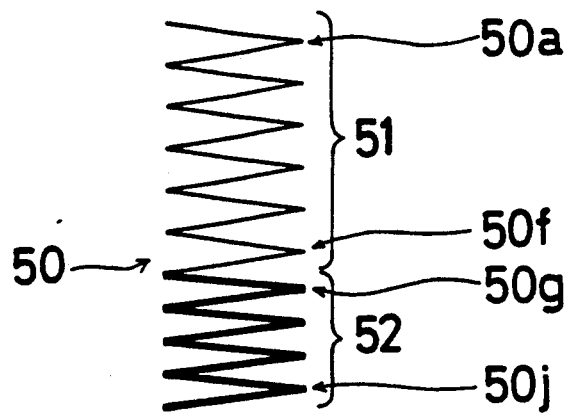
FIG. 2 is a cross-sectional view of a bellows according to first modification of the invention.

First, referring to FIG. 2, the bellows 50 from a first peak portion 50a through a sixth peak portion 50f (a thin portion 51) are thin. In the thin portion 51, for example, each thickness is 0.12 mm and each pitch of two adjacent peak portions is 1.18 mm in the free condition. The bellows 50 from the seventh peak portion 50g through a tenth peak portion 50j (a thick portion 52) are thick. In the thick portion 52, for example, each thickness is 0.15 mm and each pitch of two adjacent peak portions is 0.72 mm in the free condition. An upper end of the bellows 50 in the thin portion 51 is fixed to the stationary supporting member 16 and a lower end of the bellows 50 in the thick portion 52 is fixed to the movable supporting member 17.

Figure 3:
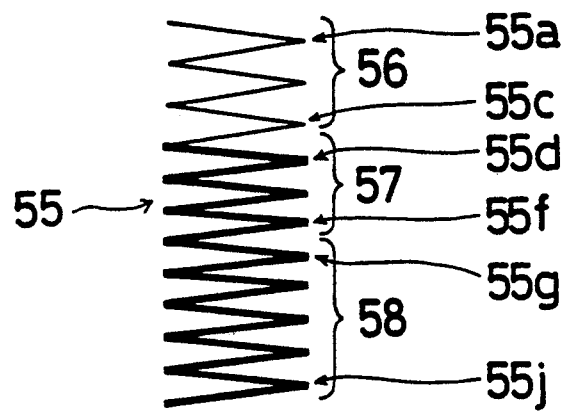
FIG. 3 is a cross-sectional view of a bellows according to second modification of the invention.

Second, referring to FIG. 3, the bellows 55 from a first peak portion 55a through a third peak portion 55c (a thinnest portion 56) are the thinnest. In the thinnest portion 56, for example, each thickness is 0.10 mm and each pitch of two adjacent peak portions is 1.38 mm in the free condition. The bellows 55 from a fourth peak portion 55d through a sixth peak portion 55f (a thinner portion 57) are thin. In the thinner portion 57, for example, each thickness is 0.12 mm and each pitch of two adjacent peak portions is 1.07 mm in the free condition. The bellows 55 from a seventh peak portion 55g through a tenth peak portion 55j (a thick portion 58) are thick. In the thick portion 58, for example, each thickness is 0.15 mm and each pitch of two adjacent peak portions is 0.66 mm in the free condition. An upper end of the bellows 55 in the thinnest portion 56 is fixed to the stationary supporting member 16 and a lower end of the bellows 55 in the thick portion 58 is fixed to the movable supporting member 17.

Figure 4:
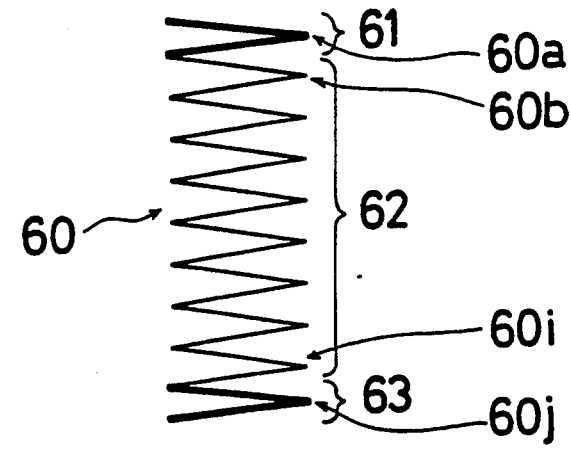
FIG. 4 is a cross-sectional view of a bellows according to third modification of the invention.

Third, referring to FIG. 4, the bellows 60 in a first peak portion 60a (a thick portion 61) is thick. In the thick portion 61, for example, the thickness is 0.15 mm and the pitch is 0.72 mm in the free condition. The bellows 60 from a second peak portion 60b through a ninth peak portion 60i (a thin portion 62) are thin. In the thin portion 62, for example, each thickness is 0.12 mm and each pitch of two adjacent peak portions is 1.18 mm in the free condition. The bellows 60 in a tenth peak portion 60j (a thick portion 63) is thick. In the thick portion 63, for example, the thickness is 0.15 mm and pitch is 0.72 mm in free condition. An upper end of the bellows 60 in the thick portion 61 is fixed to the stationary supporting member 16 and a lower end of the bellows 60 in the thick portion 63 is fixed to the movable supporting member 17.

Figure 5:
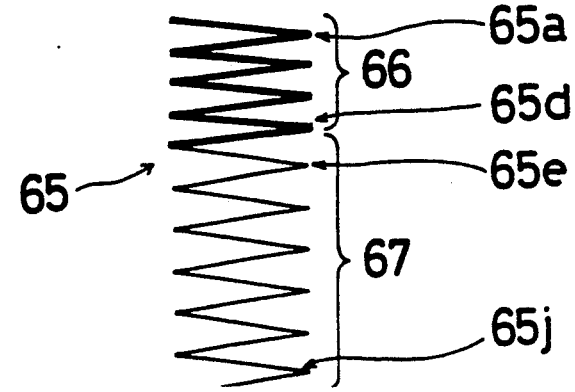
FIG. 5 is a cross-sectional view of a bellows according to fourth modification of the invention.

Next, referring to FIG. 5, the bellows 65 from a first peak portion 65a through a fourth peak portion 65d (a thick portion 66) are thick. In the thick portion 66, for example, each thickness is 0.15 mm and each pitch of two adjacent peak portions is 0.72 mm in the free condition. The bellows 65 from a fifth peak portion 65e through a tenth peak portion 65j (a thin portion 67) are thin. In the thin portion 67, for example, each thickness is 0.12 mm and each pitch of two adjacent peak portions is 1.18 mm in the free condition. An upper end of the bellows 65 in the thick portion 66 is fixed to the stationary supporting member 16 and a lower end of the bellows 65 in the thin portion 67 is fixed to the movable supporting member 17.

In all of the bellows 50,55,60,65, the pitches of the bellows are in inverse proportion to the thicknesses thereof. Namely, the pitch of two adjacent peak portions is large in the thin portion, and the pitch of two adjacent peak portions is small in the thick portion.

Each of the above mentioned bellows 50,55,60,65 is installed on the bellows pump 10, and each test result is shown in Tables 1,2 in the appendix. Four comparing modifications (not shown) are prepared and have thicknesses corresponding to the bellows 50,55,60,65 and fixed pitches (1.00 mm) in the free condition. Table 3 shows test results of the comparing modifications. In the comparing modifications, the pitches in the compression and expansion conditions are all fixed a numerical value irrespective of the thickness. So, Table 3 shows only one pattern.

Referring to Tables 1,2, when the bellows 50,55,60,65 are in a compression condition, there are no contacts of two adjacent plate elements. When the bellows 50,55,60,65 are in a compression and expansion condition, the bending quantities of the thick portions from the free condition to the compression and expansion condition particularly decrease in comparison to the bending quantities of the comparing modifications.

Other test results are shown in Table 4. Three test bellows are prepared. They are the bellows 50 of the first modification shown in FIG. 2, a bellows (comparing modification 2) having fixed thicknesses (0.15 mm) and fixed pitches (1.00 mm) and the bellows 65 (comparing modification 3) of the fourth modification shown in FIG. 5. The inner diameter of each bellows is 85 mm and the outer diameter of each bellows is 105 mm. The revolution number of the input shaft 28 is 3,500 rpm (revolutions per minutes) and the stroke of the rod 20 is 2.4 mm. Table 4 shows the maximum cycle number when the bellows become damaged. As a result, the lasting quality of the bellows of the first modification shown in FIG. 2 is best.

Namely, the thickness of the end side fixed to the movable supporting member 17 is thick in the bellows 50 of the first modification shown in FIG. 2, so the rigidity is large at the end side fixed to the movable supporting member 17 and the sympathy points are broken up. Therefore, the bellows 50 has good following characteristics with respect to the movement of the movable supporting member 17 and the energy of the sympathy is decreased, so that the end side fixed to the stationary supporting member 16 is not poorly influenced and the stress generated in the bellows 50 is decreased.

Figure 6:
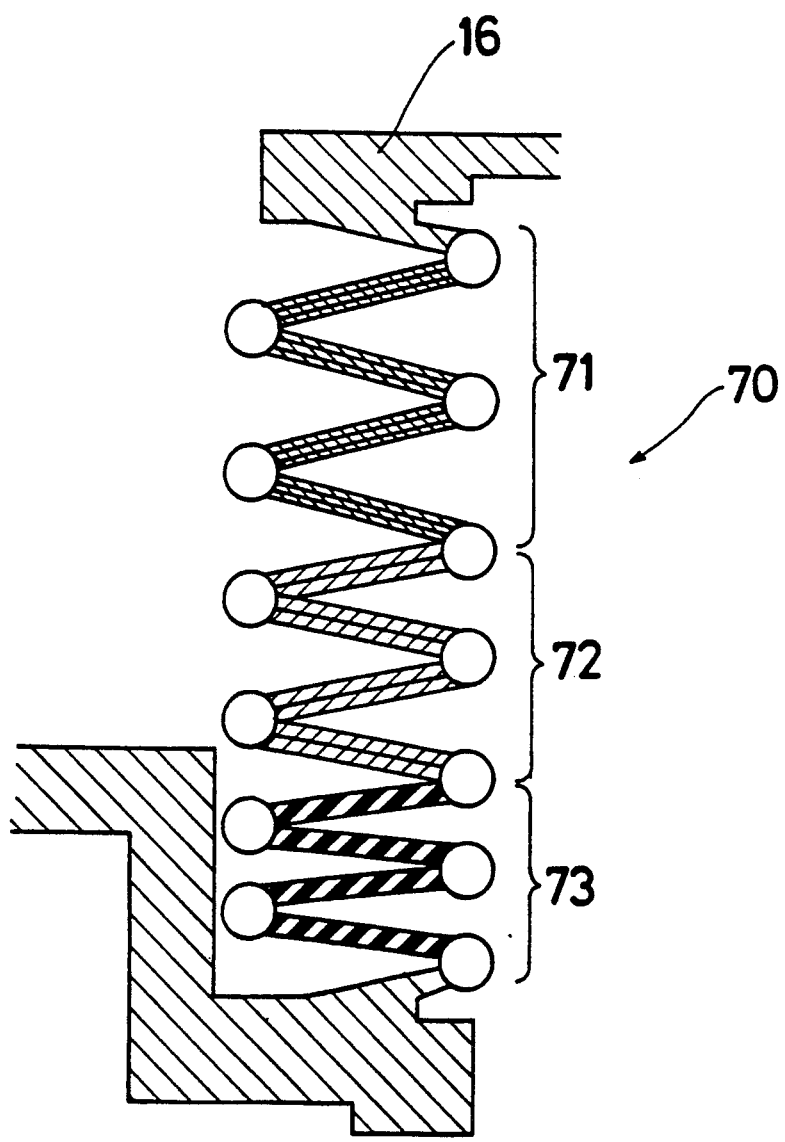
FIG. 6 is a cross-sectional view of a bellows according to fifth modification of the invention.

Finally, referring to FIG. 6, the bellows 70 has three portions 71,72,73. In the portion 71, three thinnest plate elements zig-zag or wavy configuration and are welded at each peak portion. In the portion 72, two thinner plates are zig-zag or wavy configuration and are welded at each peak portion. In the portion 73, a thick plate is zig-zag or wavy configuration. A transforming ratio at the portion 71 is larger than a transforming ratio at the portion 72, and the transforming ratio at the portion 72 is larger than a transforming ratio at the portion 73. So, a stress generated in the portions 71,72 having largest and larger transforming ratio is decreased, because each of some plates receives the stress.

Obviously, numerous modifications and variations of the present invention are possible in light of the above teachings. It is therefore to be understood that within the scope of the appended claims, the invention may be practiced otherwise than as specifically described herein.

TABLE 1
APPENDIX

| peak portions | each thickness of bellows (mm) | spring constant (kg/mm) | pitch (mm) compression codition | pitch (mm) free | pitch (mm) expansion condition |
|---|---|---|---|---|---|
| First modification shown in FIG. 2 | | | | | |
| first | 0.12 | 7.60 | 0.20 | 1.18 | 1.43 |
| second | 0.12 | 7.60 | 0.20 | 1.18 | 1.43 |
| third | 0.12 | 7.60 | 0.20 | 1.18 | 1.43 |
| fourth | 0.12 | 7.60 | 0.20 | 1.18 | 1.43 |
| fifth | 0.12 | 7.60 | 0.20 | 1.18 | 1.43 |
| sixth | 0.12 | 7.60 | 0.20 | 1.18 | 1.43 |
| seventh | 0.15 | 14.30 | 0.20 | 0.72 | 0.85 |
| eighth | 0.15 | 14.30 | 0.20 | 0.72 | 0.85 |
| ninth | 0.15 | 14.30 | 0.20 | 0.72 | 0.85 |
| tenth | 0.15 | 14.30 | 0.20 | 0.72 | 0.85 |
| Second modification shown in FIG. 3 | | | | | |
| first | 0.10 | 5.60 | 0.20 | 1.38 | 1.68 |
| second | 0.10 | 5.60 | 0.20 | 1.38 | 1.68 |
| third | 0.10 | 5.60 | 0.20 | 1.38 | 1.68 |
| fourth | 0.12 | 7.60 | 0.20 | 1.07 | 1.29 |
| fifth | 0.12 | 7.60 | 0.20 | 1.07 | 1.29 |
| sixth | 0.12 | 7.60 | 0.20 | 1.07 | 1.29 |
| seventh | 0.15 | 14.30 | 0.20 | 0.66 | 0.78 |
| eighth | 0.15 | 14.30 | 0.20 | 0.66 | 0.78 |
| ninth | 0.15 | 14.30 | 0.20 | 0.66 | 0.78 |
| tenth | 0.15 | 14.30 | 0.20 | 0.66 | 0.78 |

TABLE 2
APPENDIX

| peak portions | each thickness of bellows (mm) | spring constant (kg/mm) | pitch (mm) compression codition | pitch (mm) free | pitch (mm) expansion condition |
|---|---|---|---|---|---|
| Third modification shown in FIG. 4 | | | | | |
| first | 0.15 | 14.30 | 0.20 | 0.67 | 0.79 |
| second | 0.12 | 7.60 | 0.20 | 1.18 | 1.30 |
| third | 0.12 | 7.60 | 0.20 | 1.18 | 1.30 |
| fourth | 0.12 | 7.60 | 0.20 | 1.18 | 1.30 |
| fifth | 0.12 | 7.60 | 0.20 | 1.18 | 1.30 |
| sixth | 0.12 | 7.60 | 0.20 | 1.18 | 1.30 |
| seventh | 0.12 | 7.60 | 0.20 | 1.18 | 1.30 |
| eighth | 0.12 | 7.60 | 0.20 | 1.18 | 1.30 |
| ninth | 0.12 | 7.60 | 0.20 | 1.18 | 1.30 |
| tenth | 0.15 | 14.30 | 0.20 | 0.67 | 0.73 |
| Fourth modification shown in FIG. 5 | | | | | |
| first | 0.15 | 14.30 | 0.20 | 0.72 | 0.85 |
| second | 0.15 | 14.30 | 0.20 | 0.72 | 0.85 |
| third | 0.15 | 14.30 | 0.20 | 0.72 | 0.85 |
| fourth | 0.15 | 14.30 | 0.20 | 0.72 | 0.85 |
| fifth | 0.12 | 7.60 | 0.20 | 1.18 | 1.43 |
| sixth | 0.12 | 7.60 | 0.20 | 1.18 | 1.43 |
| seventh | 0.12 | 7.60 | 0.20 | 1.18 | 1.43 |
| eighth | 0.12 | 7.60 | 0.20 | 1.18 | 1.43 |
| ninth | 0.12 | 7.60 | 0.20 | 1.18 | 1.43 |
| tenth | 0.12 | 7.60 | 0.20 | 1.18 | 1.43 |

TABLE 3
APPENDIX
Comparing modification 1

| peak portions | pitch (mm) compression codition | pitch (mm) free | pitch (mm) expansion condition |
|---|---|---|---|
| first | 0.20 | 1.00 | 1.20 |
| second | 0.20 | 1.00 | 1.20 |
| third | 0.20 | 1.00 | 1.20 |
| fourth | 0.20 | 1.00 | 1.20 |
| fifth | 0.20 | 1.00 | 1.20 |
| sixth | 0.20 | 1.00 | 1.20 |
| seventh | 0.20 | 1.00 | 1.20 |
| eighth | 0.20 | 1.00 | 1.20 |
| ninth | 0.20 | 1.00 | 1.20 |

TABLE 3-continued
APPENDIX
Comparing modification 1

| peak portions | pitch (mm) compression codition | pitch (mm) free | pitch (mm) expansion condition |
|---|---|---|---|
| tenth | 0.20 | 1.00 | 1.20 |

TABLE 4

| | maximum cycle number when damage |
|---|---|
| First modification shown in FIG. 2 | $288 \times 10^4$ |
| Comparing modification 2 | $42 \times 10^4$ |
| Comparing modification 3 | $40 \times 10^4$ |

What is claimed is:

1. A bellows pump comprising:
a body;
a movable supporting member movably supported in the body;
a bellows fixed between the body and the movable supporting member, said bellows having peak portions; and
driving means for driving the movable supporting member,
the bellows having a thin portion and a thick portion, and pitches of the bellows being in inverse proportion to the thicknesses thereof.

2. A bellows pump as set forth in claim 1, wherein the thin portion comprises a thinnest portion and a thinner portion.

3. A bellows pump as set forth in claim 2, wherein the thinnest portion is fixed to the body and the thick portion is fixed to the movable supporting member.

4. A bellows pump as set forth in claim 1, wherein the thin portion is fixed to the body and the thick portion is fixed to the movable supporting member.

5. A bellows pump as set forth in claim 1, wherein the thick portion is fixed to the body and the thin portion is fixed to the movable supporting member.

6. A bellows pump as set forth in claim 1, wherein the thick portion is formed at both ends of the bellows.

7. A bellows pump comprising:
a body;
a movable supporting member supported in the body;
a bellows disposed between the body and the movable supporting member, said bellows being comprised of at least two bellows portions, each bellows portions being bent at least once, one of said at least two bellows portions being comprised of at least two plate elements and another one of the at least two bellows portions being comprised of at least one plate element, the number of plate elements comprising a bellows portion decreasing toward the movable supporting member, the thickness of individual plate elements comprising each bellows portion increasing toward the movable supporting member.

8. The bellows pump according to claim 7, wherein each of the bellows portions is bent more than once to form a plurality of peaks, the plate elements comprising a bellows portion being welded to one another at the peaks.

9. The bellows according to claim 7, including three bellows portions, a first one of the bellows portions being comprised of three plate elements that are bent more than once to form a plurality of peaks, a second one of the bellows portions being comprised of two plate elements that are bent more than once to form a plurality of peaks, and a third one of the bellows portions being comprised of a single plate element that is bent more than once to form a plurality of peaks.

* * * * *